Dec. 10, 1940.    A. M. WOLF    2,224,562
MOTOR VEHICLE
Original Filed April 7, 1932    2 Sheets-Sheet 1

INVENTOR
Austin M. Wolf,
BY M. C. Lyddane
ATTORNEY

Dec. 10, 1940.  A. M. WOLF  2,224,562
MOTOR VEHICLE
Original Filed April 7, 1932   2 Sheets-Sheet 2

INVENTOR
Austin M. Wolf,
BY M. C. Lyddane
ATTORNEY

Patented Dec. 10, 1940

2,224,562

UNITED STATES PATENT OFFICE 2,224,562

MOTOR VEHICLE

Austin M. Wolf, Plainfield, N. J.

Original application April 7, 1932, Serial No. 603,701. Divided and this application October 10, 1938, Serial No. 234,262

4 Claims. (Cl. 180—64)

This invention relates to motor vehicles and constitutes a division of the subject matter disclosed in an application for patent filed by me on April 7, 1932, Ser. No. 603,701, now Patent No. 2,132,450, dated October 11, 1938.

One of the objects of the present invention is to provide an internal combustion engine having a water circulating system associated therewith, the said engine and system adapted to be mounted or dismounted as a single unit with respect to the motor vehicle frame.

In one application thereof, the invention is particularly advantageous for use in connection with motor vehicle coaches of the type in which one or more motors or engines are mounted upon the rear end of the vehicle frame, and is primarily characterized by novel means for mounting or supporting the engine or engines upon transversely disposed frame members whereby the engine may be easily and quickly displaced or removed longitudinally of the frame and beyond the rear end of the vehicle body for convenience in making necessary adjustments or repairs.

It is also another object of the invention to provide the vehicle frame with a removable transverse member upon which the motors are mounted at one of their ends, and means individual to the motors and connectible therewith for sustaining one of the motors when said transverse frame member is detached in order to permit the removal of the other motor.

A further object of the invention resides in the provision of a dolly of simple and novel construction for use in facilitating the easy and quick mounting or dismounting of the engine with respect to the vehicle frame.

With the above and other objects in view, the invention consists in the improved motor vehicle, and in the form, construction and relative arrangement of the several parts, as will hereinafter be more fully described, illustrated in the accompanying drawings and subsequently incorporated in the subjoined claims.

In the drawings wherein I have illustrated several simple and practical embodiments of my present invention, and in which similar reference characters designate corresponding parts throughout the several views.

Figure 1:
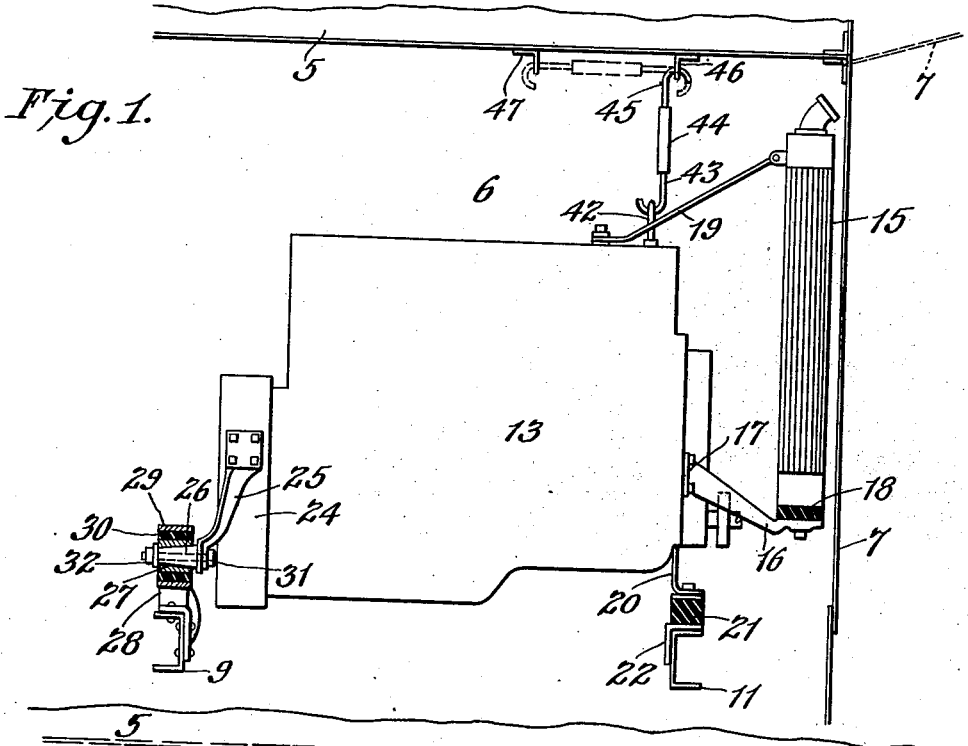
Fig. 1 is a side elevation showing an internal combustion engine with its cooling system mounted at the rear end of the motor vehicle body, in accordance with one embodiment of the invention, certain of the parts being shown in section.
Figure 2:
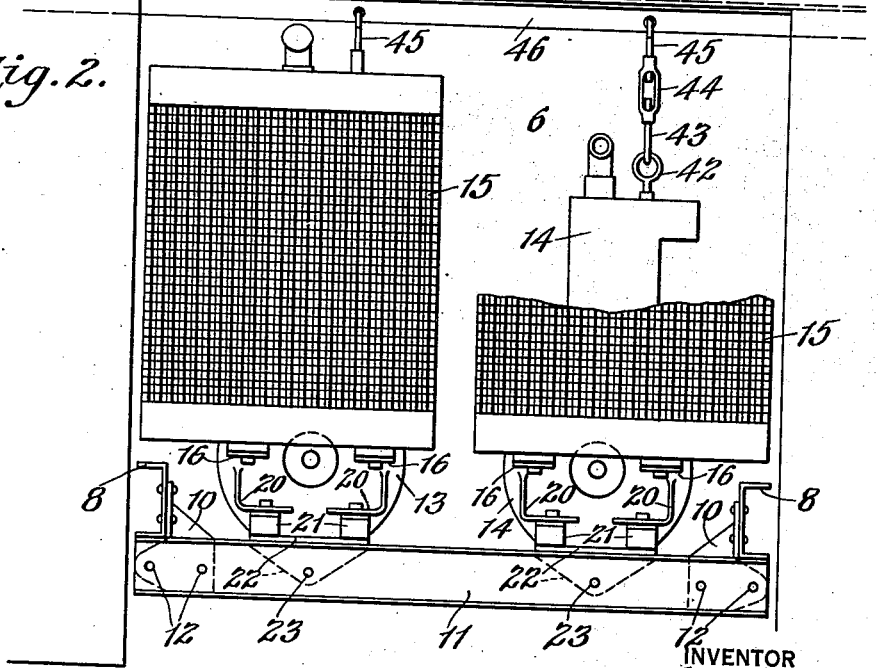
Fig. 2 is a rear elevation, one of the engine radiators being partly broken away.
Figure 3:
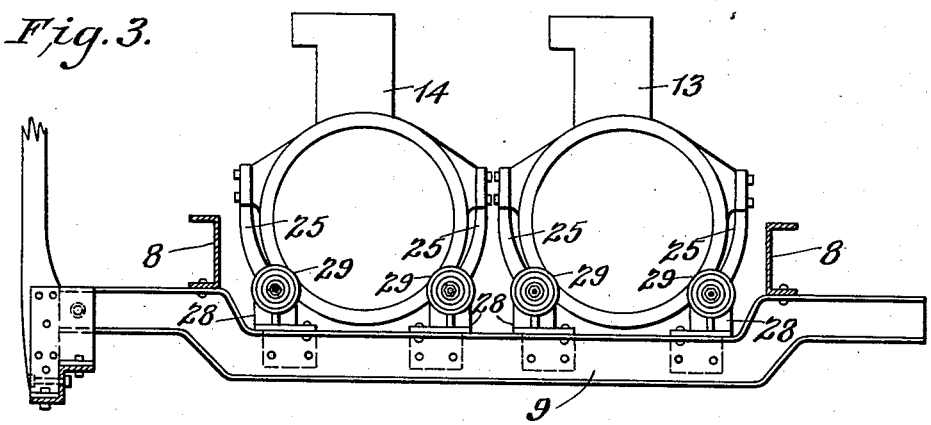
Fig. 3 is a front end elevation.

Referring in detail to the drawings and for the present more particularly to Figs. 1, 2 and 3 thereof, 5 designates a portion of the motor vehicle body, and, in the present instance represents the rear end portion of a coach body, which overhangs the rear end of the vehicle frame or chassis to provide an engine receiving compartment, indicated at 6. The rear end of this compartment is normally closed by a suitable door 7 having a grill or reticulated section in alignment with the water circulating radiator of the motor, to be presently referred to.

The vehicle frame or chassis includes transversely spaced longitudinally extending frame members 8 which are rigidly connected at suitably spaced intervals by transverse frame members one of which is indicated at 9. In rearwardly spaced relation from the frame member 9 a depending bracket 10 is secured to each of the longitudinal members 8 and to these brackets the opposite ends of a removable transverse member 11 are detachably secured by suitable bolts 12.

For purposes of illustration I have shown a pair of internal combustion engines 13 and 14 respectively, adapted to be mounted and arranged in side by side relation within the compartment 6. Each of these engines is provided with a dependent cooling system which includes a water circulating radiator 15. At its lower end the radiator is supported by suitably spaced bracket arms 16 bolted to the engine cylinder block, as at 17. Preferably rubber mountings 18 are interposed between the bracket arms and the base of the radiator to absorb or cushion vertical movement of the radiator resulting from engine vibration. At its upper end, each radiator is rigidly braced and supported from the engine cylinder block by the connecting rod 19. Of course the usual hose connections are provided between the upper and lower ends of the radiator cor and the engine cylinder jackets.

The engine cylinder block is formed or provided at the front end thereof with transversely spaced foot members 20, said foot members and interposed cushioning blocks of rubber 21 being suitably bolted to the opposite ends of a horizontal top flange of the mounting bracket 22, the vertical flange of which is detachably secured to the removable member 11 by the bolt 23. As illustrated, I have shown the top flange of this bracket in superimposed contact with the frame 11 so that a single bolt 23 may be used for connecting the mounting bracket to said frame member, with assurance against any tilting or pivoting movement of said bracket.

Each of the engines 13 and 14 is provided at its rear end with the conventional bell-housing 24, to opposite sides of which the upper ends of supporting brackets 25 are rigidly secured. At their lower ends these brackets are provided with rearwardly extending longitudinally tapered gudgeons 26 upon which internally tapered sleeves 27 are fitted. Supporting brackets 28 project upwardly from the transverse frame member 9 and between the annular upper ends 29 of these brackets and the sleeves 27, the rubber bushings 30 are interposed. A bolt 31 extends through the gudgeon 26 and by means of the adjustable nut 32 threaded on this bolt said gudgeon and the sleeve 27 are retained in rigidly assembled relation.

Figures 4, 5:
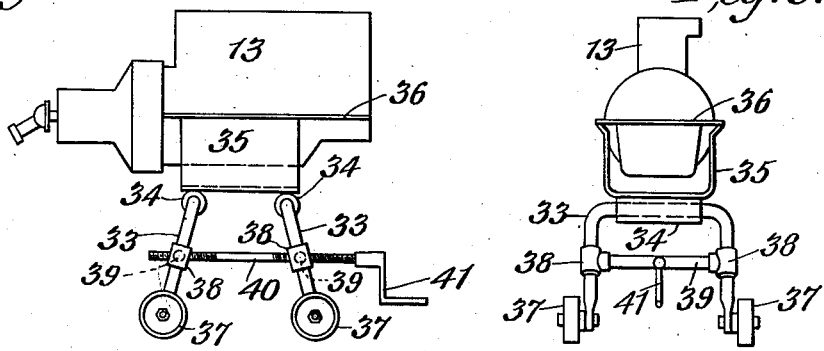
Fig. 4 is a side elevation of a dolly with the engine supported thereon for movement to or from its mounted position on the vehicle frame.
Fig. 5 is an end elevation thereof.

In order to facilitate the movement of the engine to and from its assembled position on the vehicle frame, I provide the dolly illustrated in Figs. 4 and 5 of the drawings. As shown, two similar members 33 of inverted U-shaped form have their upper intermediate portions rotatably engaged in the transverse sleeves 34 suitably fixed to the opposite ends of a cradle 35. This cradle receives the engine crankcase, the side walls of said cradle, at their upper ends, having bearing contact with the crank-case flange 36.

The legs of each member 33 are provided at their lower ends with ground engaging wheels 37, and said legs intermediate of their ends are provided with T-fittings 38 in which the opposite ends of a cross-rod 39 are rotatably supported. These cross-rods of the two members 33 are connected by a rod 40 having spaced right and left hand threaded sections, as shown, in engagement with the respective cross-rods. It is thus apparent that when the rod 40 is rotated by means of the hand crank 41 at one end thereof, the members 33 will be relatively moved to or from positions in vertical parallel relation so that the engine, supported in the cradle 35, will be raised or lowered accordingly.

Assuming that it is desired to remove one of the engines from its mounted position, for instance the engine 13, the connection between the transmission and the propeller shaft is first broken, said shaft resting upon the rear axle housing, and the door or cover 7 of the engine compartment is then swung to its open position, as indicated in dotted lines in Fig. 1. The dolly or hand truck, as shown in Fig. 4, is then placed in position beneath the engine 13 and the adjusting rod 40 operated to raise the cradle 35 until it contacts with the flange 36. The bolts 31 are then removed, as well as the bolt 23 which secures the mounting bracket 22 to the frame member 11. Each of the engines is provided at the top thereof and at its forward end with an eye-bolt 42 with which a hook 43 is adapted to be detachably engaged. This hook is connected by a turnbuckle 44 with rod 45 attached to the vehicle body 5 by bracket 46. A second bracket 47 on the vehicle body removably supports the hook 43 when the latter is not in use. One of these adjustable supporting hooks is provided for each of the engines and the hook is engaged through the eye-bolt 42 of the engine 14 and the turnbuckle 44 is rotated in order to take the weight of the engine from the transverse frame member 11. The bolt 23 of this mounting bracket is now also removed. Due to the provision of the rubber bushings 30 in the front end mountings of the engine, this slight vertical movement of the rear end of the engine 14 with its radiator 15 is permissible without disturbing said front end mountings, as flexibility thereof allows for such slight angular tilting of the engine.

Since the weight of the engine has now been relieved from the transverse frame member 11, the bolts 12 at opposite ends thereof can be taken out to disconnect said member from the brackets 10 so that said member can be removed. Engine 13 now being supported entirely upon the cradle 35 of the dolly, said dolly is drawn rearwardly from beneath the vehicle frame and as all obstructions have been removed, the engine together with its cooling system will be horizontally or longitudinally withdrawn from the engine compartment to a position beyond the rear end of the vehicle body. In this manner, I avoid the loss of time and labor incident to the breaking of the water hose connections between the radiator and the engine cylinder jackets.

In replacing the engine, it is first mounted upon the cradle 35 of the dolly with the supporting members 33 therefor in the relative positions shown in Fig. 4, and then wheeled back into position between the frame members 8, and the tapered gudgeons 26 enter the respective sleeves 27 and said movement being continued until there is full bearing contact between the tapered surfaces of the gudgeons and the sleeves. Bolts 31 are then replaced and tightened. The transverse frame member 11 is now arranged in position and rigidly connected with brackets 10 by the bolts 12, and the cradle 35 of the dolly then lowered so that the front mounting bracket 22 is again positioned upon the member 11. The connecting bolt 23 is now replaced. The hook 43 is now disengaged from the eye-bolt 42 of engine 14 by adjusting the turnbuckle 44, and when the weight of the engine is fully upon the frame member 11, the other bolt 23 is replaced to rigidly connect the front end mounting of the engine 13 to said frame member.

Figure 6:
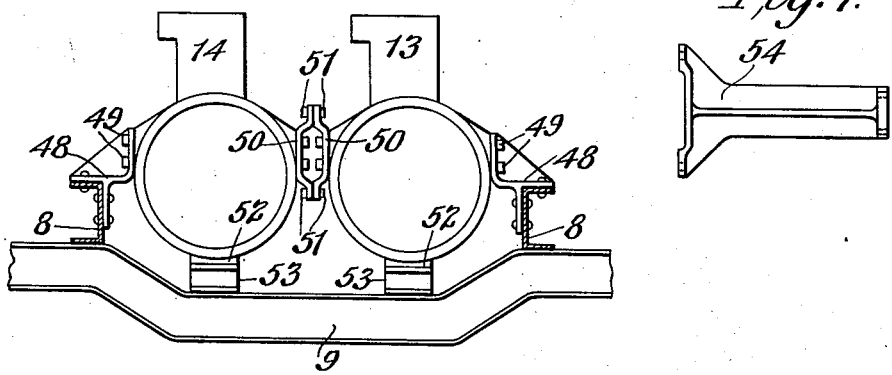
Fig. 6 is a front end elevation similar to Fig. 3 showing a slightly modified mounting for the front ends of the motors, and, Fig. 7 is a detail elevation of the spacer member which is substituted for one of the engines or motors of Fig. 6 when the latter is removed.

In Fig. 6 of the drawings, I show a rigid mounting for the front ends of the two engines or motors, in which the said engines in addition to being rigidly connected to the frame are also rigidly connected to each other. Thus I provide upon the longitudinal frame members 8 the upstanding brackets 48 which are adapted to be detachably bolted as at 49 to mating portions formed on the outer sides of the bell-housings of the respective motors. At their inner sides, these bell-housings carry the mating brackets 50 adapted to be detachably bolted together as at 51.

Each bell-housing is further provided at its base with a boss 52 which is connected by a bracket 53 with the transverse frame member 9. In this manner, it will be evident that a completely rigid transverse connection is established through the front ends of the engines or motors between the spaced longitudinal frame members 8.

Figure 7:
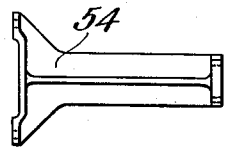

Either one of the two motors or engines may be easily and quickly removed, and it is, therefore, possible to substitute for a disabled engine, one of the engines of another bus or coach or a spare engine kept on hand by the operating company at a bus station. Thus annoying delays in the making of repairs will be avoided. As will be seen from a consideration of my issued patent, either engine may be removed and the operation of the bus continued with the other engine. In order that this may be done, in the construction shown in Fig. 6, when one engine is removed, the spacer bar 54 shown in Fig. 7, is inserted between one of the frame brackets 48 and the bracket member 50 on the remaining engine, the opposite ends of said spacer bar being properly formed to mate with said brackets and receive the connecting bolts, 49 and 51 respectively.

From the foregoing description, considered in connection with the accompanying drawings, it will be seen that I have devised a simply constructed and reliable means whereby one or more engines or motors may be easily and quickly removed from or replaced in its mounted position upon the vehicle frame. By providing the engine or motor with its water circulating radiator in the form of a permanently assembled unit, I reduce to a minimum the number of parts which must be disconnected in removing the motor. Therefore, when replacements are available, a disabled motor may be removed and replaced by another motor without loss of time or serious interruption of the time schedule of the motor coach or bus. Since the two engines or motors are independently operable to drive the rear wheel axle, as disclosed in my issued patent, if a replacement motor is not available, the disabled engine can be removed for repairs and operation of the coach or bus continued with the remaining motor.

In the above description, I have referred to several practical and satisfactory means for mounting the motors upon the vehicle frame. It is, however, to be understood that the essential features of my present disclosure might also be exemplified in numerous other alternative structural forms. Accordingly, the privilege is reserved or resorting to all such legitimate changes in the form, construction and relative arrangement of the several parts, as may fairly be comprehended within the spirit and scope of the appended claims.

I claim:

1. In combination with a motor vehicle frame having longitudinal frame members and a transverse connecting member therebetween, an internal combustion engine, means for demountably supporting said engine at one end upon said transverse frame member, means for demountably supporting the engine at its other end, including a supporting member and means removably securing said member to the vehicle frame, and additional means carried by the vehicle for temporarily supporting the engine independently of said supporting member to permit removal of said member with respect to the engine and of the engine with respect to the vehicle frame.

2. In combination with a motor vehicle frame having transversely spaced longitudinal frame members, a pair of engines, and means for independently removably mounting said engines in transverse alignment between said frame members, including means for detachably and rigidly connecting each engine at its outer side to one of said frame members, mating members on the inner sides of said engines and means for detachably connecting the same with each other, and a rigid spacing member adapted to replace either engine when removed and having means at its opposite ends for connection with said mating member of the other engine and with one of said frame members, respectively.

3. In combination with a motor vehicle frame having longitudinal frame members and spaced transverse connecting members between the rear ends of said longitudinal frame members, a power unit horizontally movable to and from its applied position with respect to said transverse members, means for removably supporting said unit at its front end upon the forward transverse frame member, a supporting element carried by the rear end of said unit having abutting contact with the rear side of the rear transverse frame member, means for detachably connecting said element with said member, means for removably securing the rear transverse frame member to the longitudinal frame members, and means on the vehicle adapted to be connected with the power unit to temporarily support the same prior to its horizontal displacement relative to the vehicle frame.

4. In combination with a motor vehicle frame having longitudinal frame members and spaced transverse connecting members between the rear ends of said longitudinal frame members, a power unit horizontally movable to and from its applied position with respect to said transverse frame members, means on the forward transverse frame member and the front end of said power unit for demountably supporting the latter at transversely spaced points, a supporting element carried by the rear end of said unit, means for detachably connecting said element with said rear transverse frame member, means for removably securing the latter frame member at its opposite ends to said longitudinal frame members, and means on the vehicle adapted to be connected with the power unit and support the rear end thereof independently of said rear transverse frame member while the latter is disconnected from said supporting element and removed from the vehicle frame prior to the horizontal displacement of the power unit relative to said frame.

AUSTIN M. WOLF.